Aug. 25, 1964   J. T. McNANEY   3,146,367
ELECTROSTRICTIVE APPARATUS FOR CHANGING DISPLAYS
Filed July 5, 1960   11 Sheets-Sheet 1

JOSEPH T. McNANEY
INVENTOR.

Aug. 25, 1964  J. T. McNANEY  3,146,367
ELECTROSTRICTIVE APPARATUS FOR CHANGING DISPLAYS
Filed July 5, 1960  11 Sheets-Sheet 2
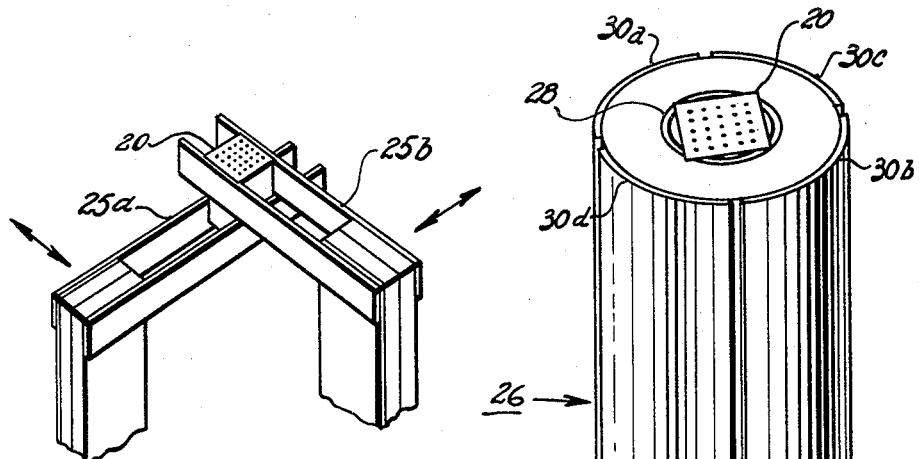
Fig. 3
Fig. 4
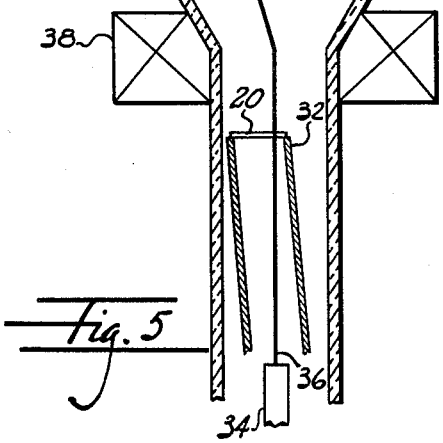
Fig. 5
JOSEPH T. McNANEY
INVENTOR.

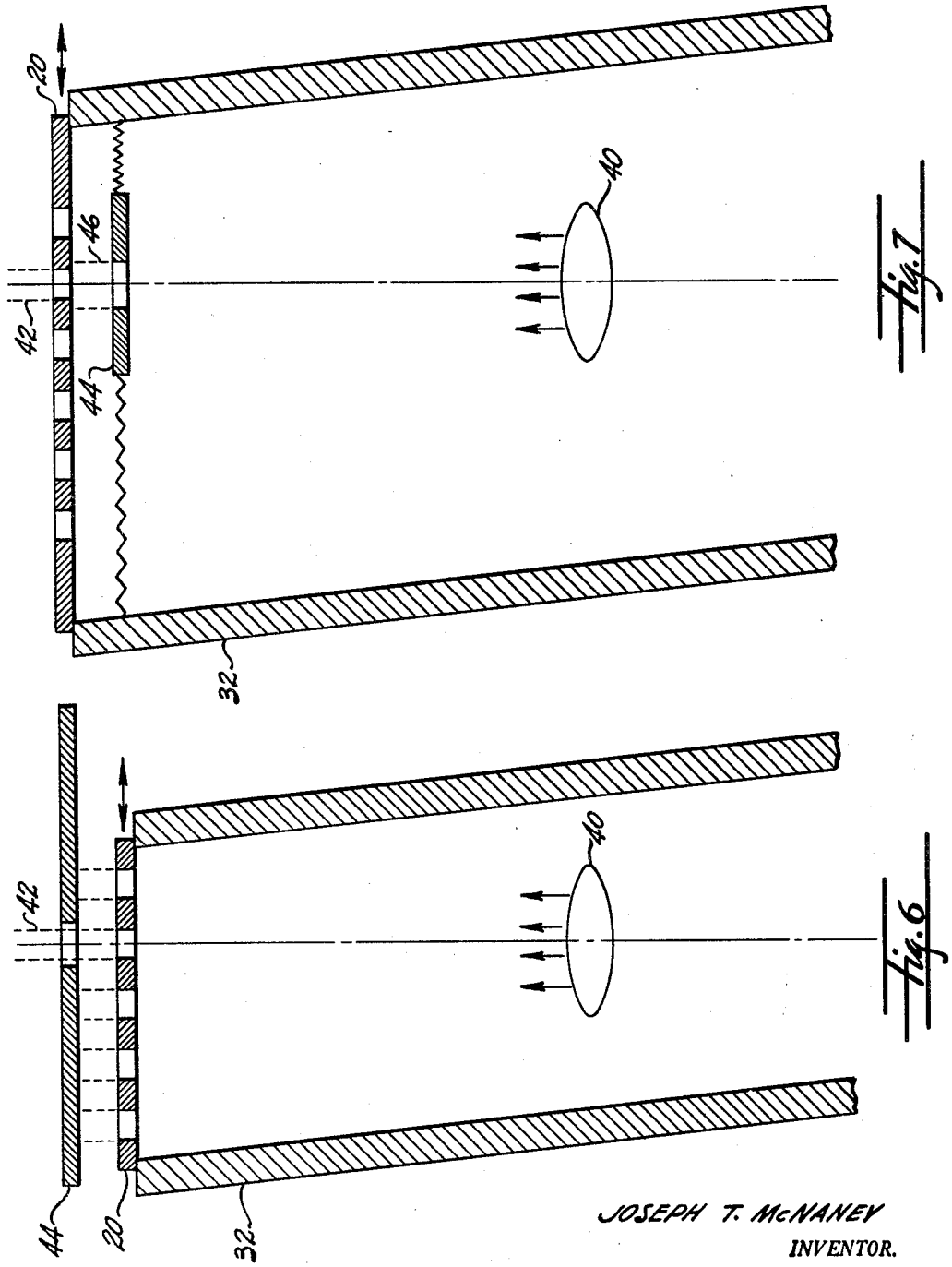

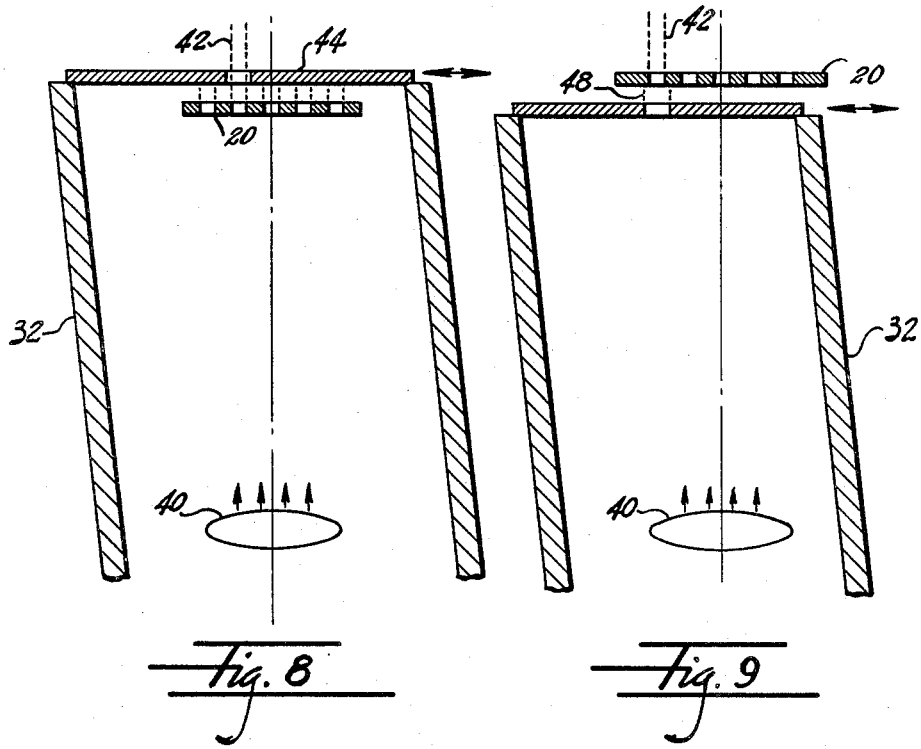
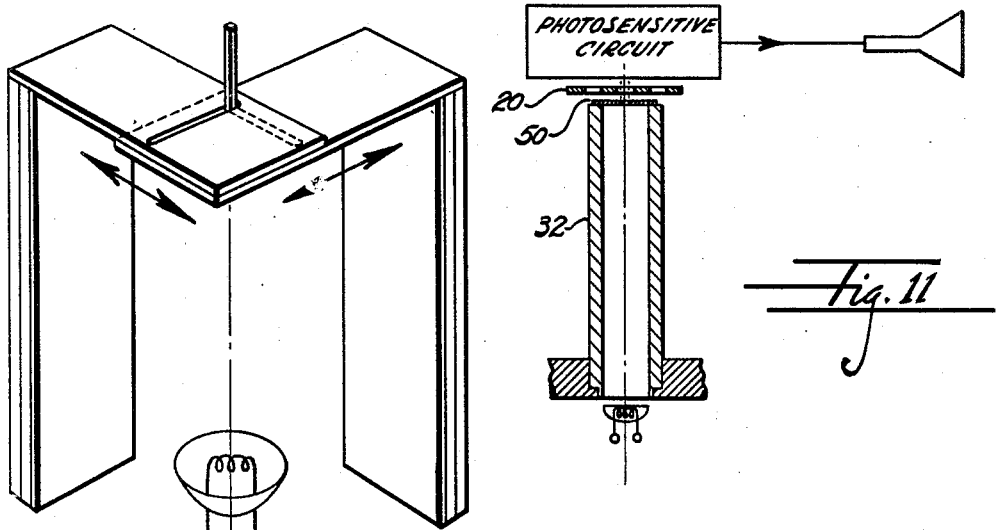

Aug. 25, 1964   J. T. McNANEY   3,146,367
ELECTROSTRICTIVE APPARATUS FOR CHANGING DISPLAYS
Filed July 5, 1960   11 Sheets-Sheet 5

JOSEPH T. McNANEY
INVENTOR.

Aug. 25, 1964    J. T. McNANEY    3,146,367
ELECTROSTRICTIVE APPARATUS FOR CHANGING DISPLAYS
Filed July 5, 1960    11 Sheets-Sheet 7

JOSEPH T. McNANEY
INVENTOR.

JOSEPH T. McNANEY
INVENTOR.

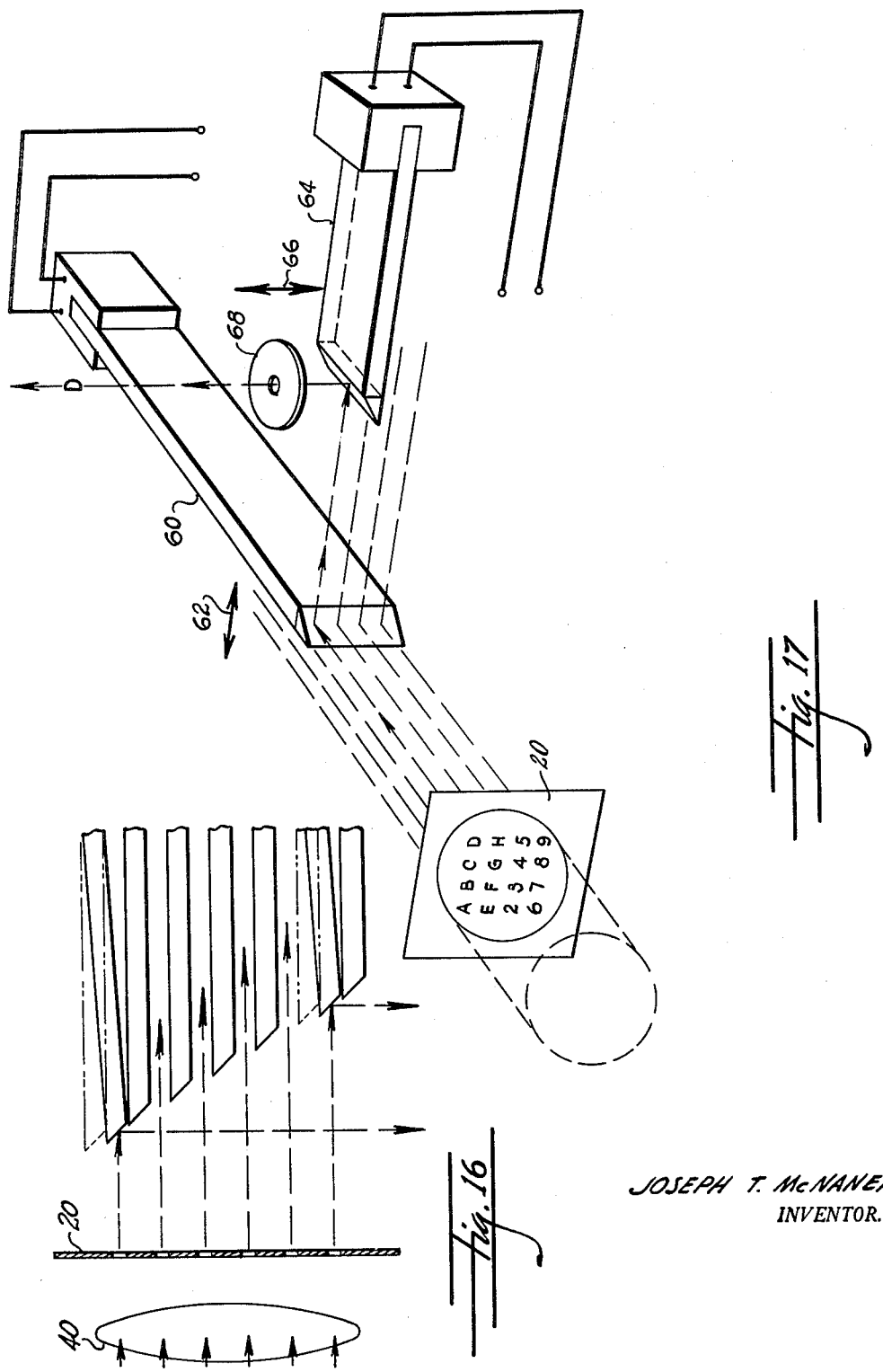

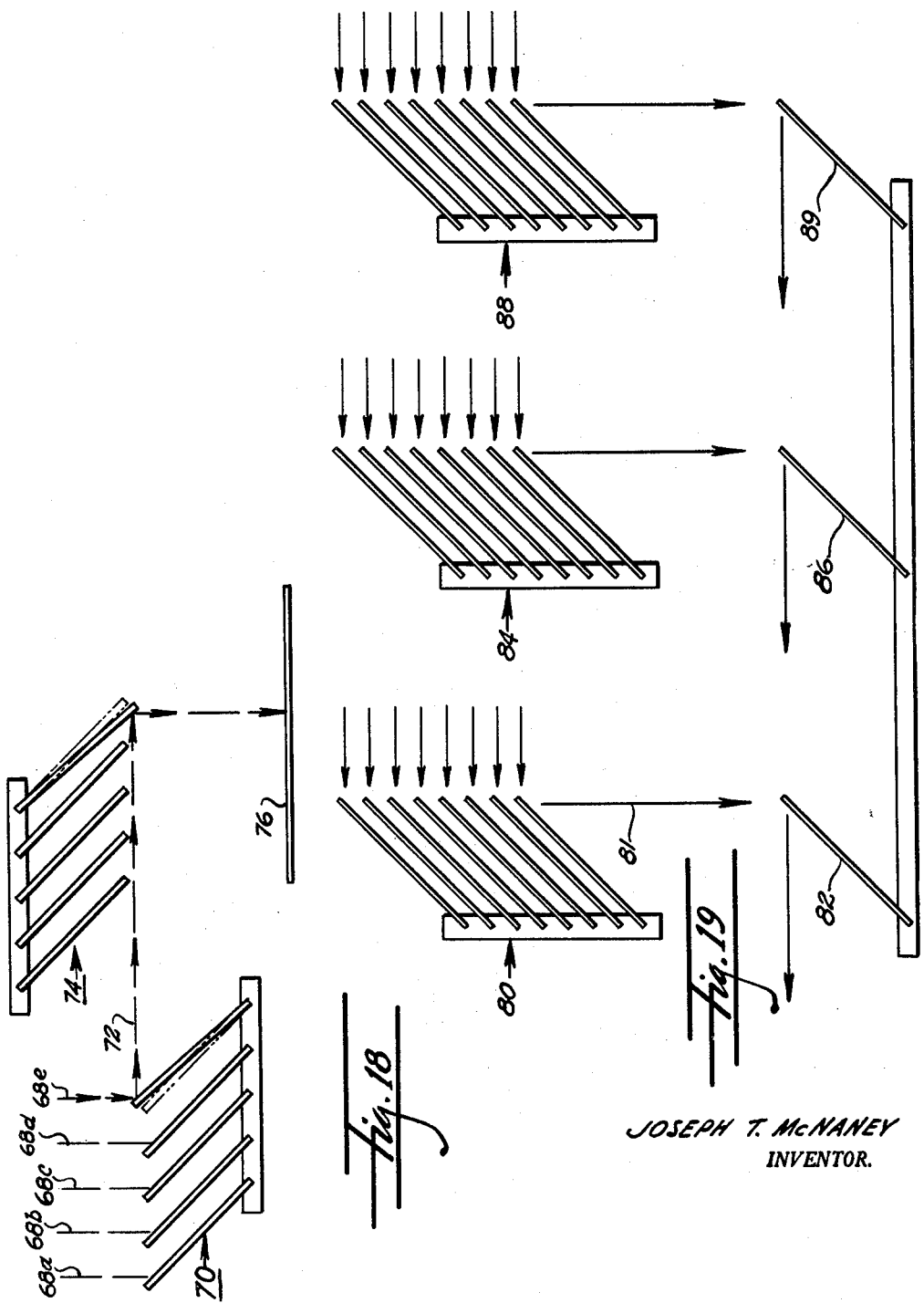

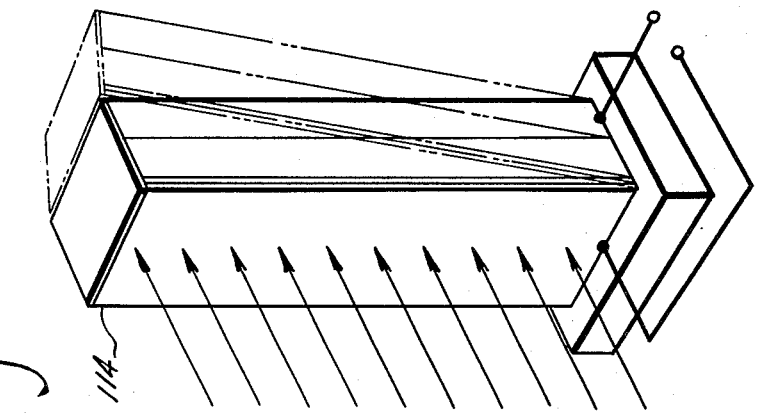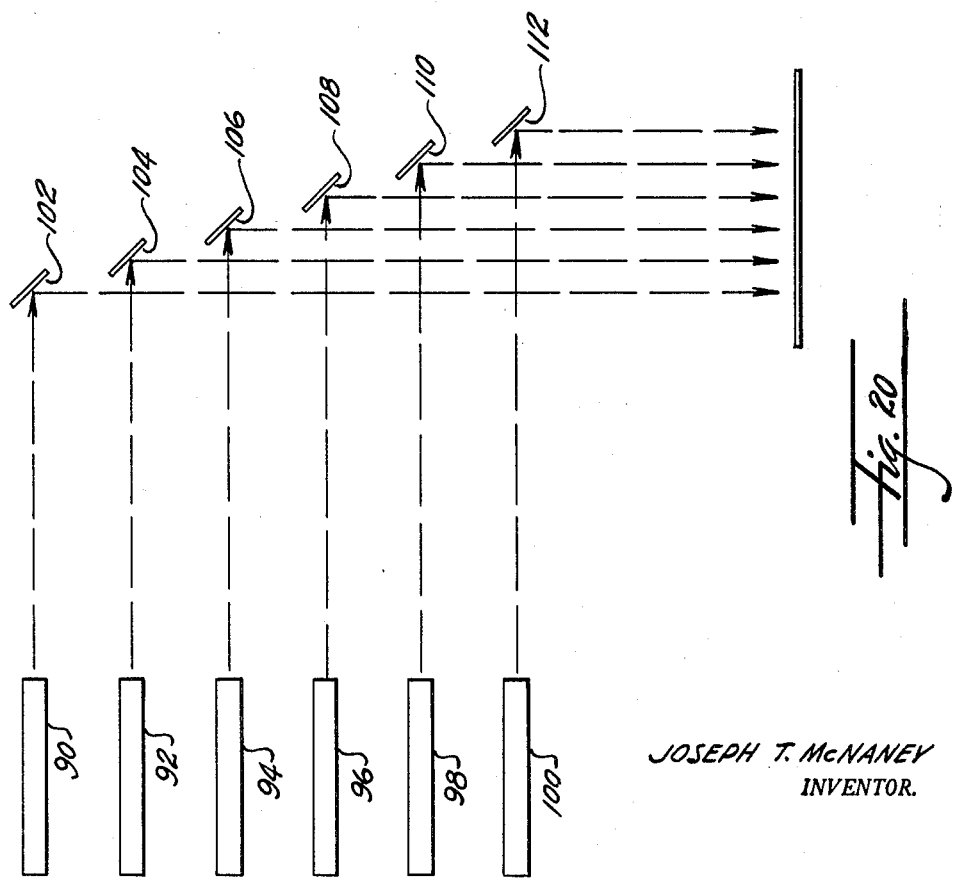

United States Patent Office 3,146,367
Patented Aug. 25, 1964

3,146,367
ELECTROSTRICTIVE APPARATUS FOR
CHANGING DISPLAYS
Joseph T. McNaney, La Mesa, Calif., assignor to General
Dynamics Corporation, Rochester, N.Y., a corporation
of Delaware
Filed July 5, 1960, Ser. No. 40,796
34 Claims. (Cl. 313—86)

This invention relates to display appartus; and more particularly to apparatus for shaping electron beams, shaping light beams, and directing shaped light beams to light receptors.

It is often desired to produce displays that incorporate characters such as letters, numbers, symbols, etc.; one of the most successful present-day methods uses the device known as the "shaped beam" cathode ray tube. This tube has an apertured mask, known as a "matrix," that contains stencil-like apertures shaped to represent various characters. An electron beam is deflected so that it traverses selected apertures; the emergent beams being thereby "shaped" so that their cross sections correspond with specific characters. The shaped electron beams are then directed to a fluorescent screen where they produce light patterns that correspond to desired characters. Suitable juxtapositioning of a plurality of light patterns spells out a message.

As may be expected, the shaped beam tube—despite its success, has inherent problems. One of these results from the fact that the electron lenses and the electron beam deflecting fields required for directing the electron beams have fringe effects that introduce various types of distortion.

It is therefore the principal object of my invention to provide apparatus that produces an improved character-type display.

The attainment of this object and others will be realized from the following specification taken in conjunction with the drawings of which:

FIGURES 1, 2, 3 and 4 illustrate the basic concept of my invention;

FIGURE 5 shows how my invention produces a shaped electron beam;

FIGURES 6, 7, 8, 9 and 10 illustrate how my invention produces a shaped light beam;

FIGURE 11 shows how my invention provides a video signal that can be applied to a cathode ray tube;

FIGURES 12 to 20 illustrate embodiments for shaping and directing light beams to a light receptor; and FIGURE 21 shows how an electrostrictive element can be energized by light.

My invention contemplates the use of electrostrictive materials to produce movements that shape an electron beam, or shape and/or direct a light beam, depending upon the particular embodiment.

Figures 1, 2:
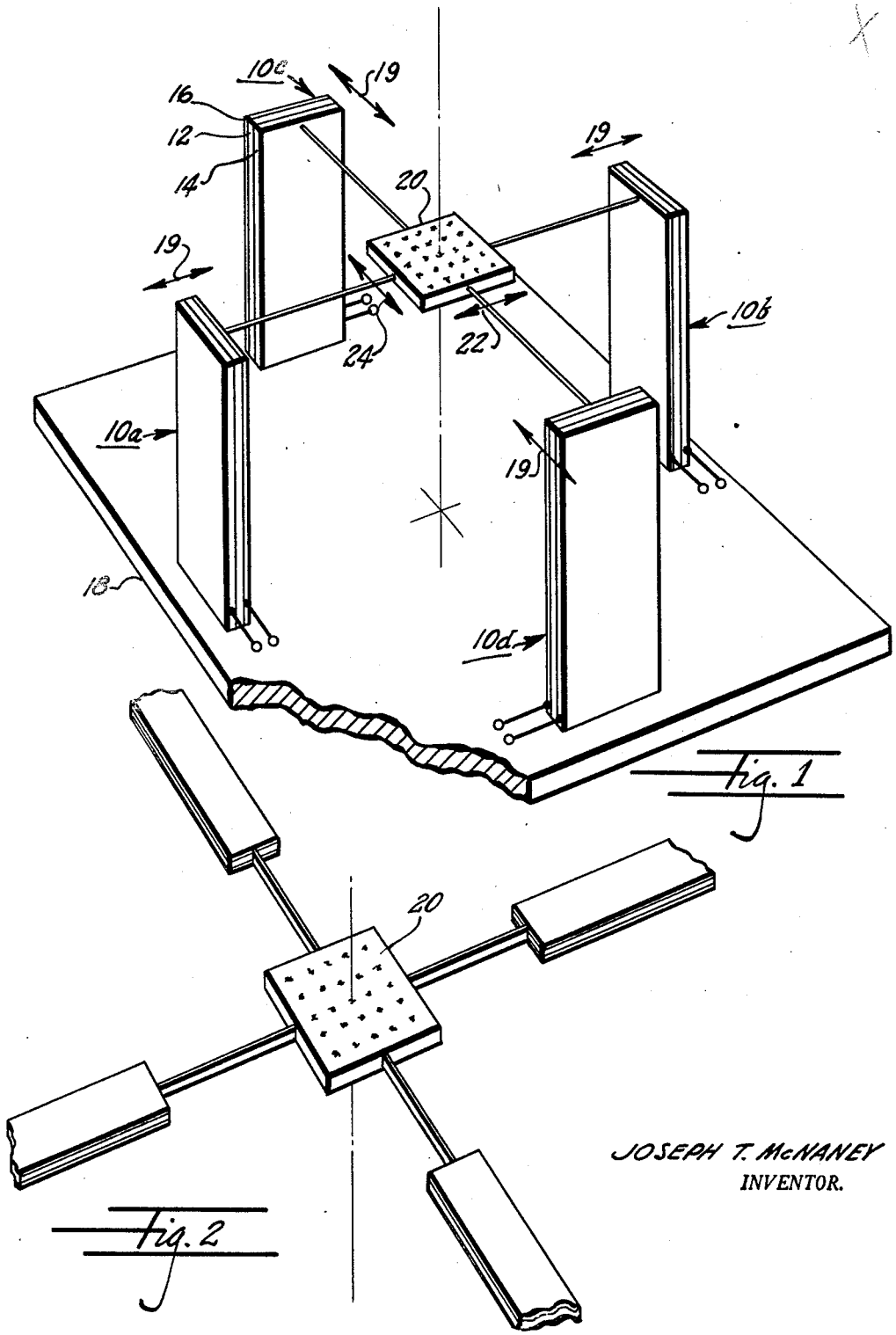

FIGURE 1 shows the use of electrostrictive elements to move an apertured matrix, so that a selected aperture may be positioned on the axis. Four electrostrictive elements, or actuators—identified as 10a, 10b, 10c and 10d—are shown. Each comprises a central strip 12 of electrostrictive or piezoelectric material that, when energized, has the property of expanding in one direction and contracting in another. Many materials are known to have this property; among them are barium titanate and mixtures of lead zirconate and lead titanate.

In FIGURE 1, conductive members 14 and 16 are positioned contiguously with opposite surfaces of electrostrictive material 12 to form a "sandwich." Conductive members 14 and 16 act as electrodes to apply the energizing potential to the electrostrictive material; electrode 16—shown as being relatively thick—restricts the elongation and shortening of material 12. This restriction, plus the fact that one end of the electrostrictive element 10 is firmly held in a baseplate 18, causes elements 10 to bend upon the application of an energizing potential. Their free ends therefore move in the direction of the double-ended arrows 19. This bending action of the energized electrostrictive element is somewhat analogous to that of a heated bimetal thermostat.

A matrix 20, i.e., a sheet of material having stencil-like apertures, is affixed to the end of the electrostrictive structure.

In operation, each pair of electrostrictive elements—10a and 10b, and 10c and 10d—bends perpendicularly to the other pair. When electrostrictive elements 10a and 10b are suitably energized, they act in a "push-pull" manner to move matrix 20 in the direction of arrow 22. Similarly, when the second pair of electrostrictive elements 10c and 10d is energized, they also act in a push-pull manner; and the matrix moves in the direction indicated by arrow 24. When both pairs of elements are energized, matrix 20 moves diagonally; the direction and amount depending upon the energizing signals. Thus, the matrix is moved so that any desired aperture is positioned on the axis of the electrostrictive actuator structure.

If desired, one element of a pair of actuators may be replaced with a column that supports the matrix, but does not produce a push-pull movement.

FIGURE 2 shows a type of matrix-positioning actuator wherein the electrostrictive elements are permitted to elongate and shorten, rather than being forced to bend. This action is produced by using electrodes that do not restrict the dimensional changes of the elements. In this embodiment the matrix is shown supported from the ends of the electrostrictive elements by flat strips; but rods or wires can be used.

FIGURE 3 shows another matrix-moving embodiment wherein yokes 25 transmit the movement of the electrostrictive elements to the matrix which is slidably mounted therein. Of course, four elements can be used for push-pull operation, instead of the two shown.

Whereas FIGURES 1 to 3 described a "strip" type actuator, FIGURE 4 illustrates a "tubular" type wherein the electrostrictive material takes the form of a cylindrical tube 26. One surface of the tube, shown for ease of explanation as the inner surface, has a continuous conductive film 28 thereon; the film acting as one electrode. The outer surface is coated with four substantially equal films—30a, 30b, 30c, and 30d—each film serving as an electrode.

In the structure of FIGURE 4, each quadrate of the tube acts like an electrostrictive element; and oppositely positioned ones operate in the push-pull manner previously described. Matrix 20, which is affixed to the end of the actuator, can therefore move in any direction in accordance with the energizing signals.

Depending upon their requirements, embodiments to be hereinafter disclosed can use any one of the disclosed actuators.

In the operation of the shaped beam tube, electron beams are first deflected so that they traverse apertures of the matrix, in order to shape the cross section of the emergent beams. A selected shaped beam is then deflected back to and along the axis of the tube, so that the character-shaped pattern can be displayed on the faceplate. Thus, to display the characters of the matrix, the electron beam must be deflected twice. When the characters to be displayed are at the corners of the matrix, and therefore remote from the axis, this double deflection not only require relatively large amounts of power, but also causes the shaped beams from the corner apertures to suffer the most distortion.

The embodiment of my invention shown in FIGURE 5 overcomes this problem. Here a cathode ray tube 31 contains an electrostrictive structure 32 that has a matrix 20 affixed to the end thereof. Suitable energizing signals cause the structure to distort as previously described, and to thus position any desired aperture of the matrix on the tube's axis. Electron gun 34 produces an axial electron beam 36 that traverses the axially positioned aperture.

The advantage of the embodiment shown in FIGURE 5 is that after the electron beam has been shaped by passing through the aperture, it is still on the axis; and may then be deflected by any suitable means, such as deflection coil 38, to any desired position on the faceplate of the cathode ray tube to produce a light pattern. Thus the prior art deflection fields which tended to distort the electron beam are eliminated.

Actuator 32 is then re-energized so that it positions another aperture on the axis.

Thus my invention produces "bursts" of shaped electron beams that are always on the axis. The resultant display therefore does not suffer the aberrations resulting from the double deflection and axial repositioning of the electron associated with prior art shaped beam tubes.

While shaped beam tubes are extremely useful and have been very successful, they seem to be approaching the upper limit of their abilities. For example, for larger displays the cathode ray tube becomes prohibitively large, long, heavy and expensive. Moreover, it requires power-consuming and complex distortion-minimizing circuitry. Furthermore, a larger number of characters is becoming increasingly desirable, and this leads to greater distortions—because the additional characters are progressively farther from the axis. In addition, the advantage of greater display flexibility would be obtained by being able to interchange various matrices; but this result cannot be obtained when the matrix is enclosed in a sealed and evacuated cathode ray tube.

There are also problems inherently associated with the use of a matrix for shaping an electron beam. First of all, the matrix itself is difficult to make. Secondly, certain letters such as "A," "B," "D," and "O" have central portions that fall out unless there are "bridges" supporting them; and these bridges tend to appear in the display. Thirdly, the matrix is quickly destroyed by undue intensity variations of the electron beam.

It is my belief that the next step in character display will be one within light beams are shaped so that their cross sections have the desired configuration, and are then projected onto light receptors—such as viewing surfaces or light-sensitive media such as tape, photographic film, photoconductors, etc.

This new approach has several advantages. Firstly, light beams are readily produced; there is available a large variety of light sources, such as cathode ray tubes, arcs, lamps, etc. Secondly, light beams are readily shaped; a photographic film is especially good, since the characters can be very small and well defined—and in addition the bridging problem is obviated. Thirdly, the light beam shaping matrix is relatively safe from destruction. Fourthly, it does not have to be in a sealed evacuated bulb; and may therefore easily be changed or replaced. Furthermore, light beams—unlike electron beams—can be readily directed through large angles by mirrors, without introducing distortion.

My invention is particularly useful in the shaped-light-beam approach, as may be seen by reconsidering FIGURES 1, 2, 3 and 4. In each of these arrangements, a light can be positioned below the matrix or in optical alignment therewith—to direct light thereat; and shaped light beams can then be produced by directing the light through selected apertures, or by various other methods.

One way of producing shaped light beams is shown in FIGURE 6, wherein a broad light beam 40 impinges on matrix 20 to produce a plurality of shaped light beams 42. As matrix 20 is moved by actuator 32, selected light beam shaping "apertures"—which in the case of film would be transparent areas—are sequentially positioned on the axis. A fixedly positioned baffle 44, having a single axially-positioned opening, blocks all the shaped light beams except the axial one. Movement of matrix 20 thus produces axial "bursts" of light having the desired cross sections.

Alternatively, as shown in FIGURE 7, baffle 44 may be fixedly positioned in the path of light beam 40 to produce a single axial beam 46. This light beam is then shaped by traversing the axially-positioned aperture of matrix 20, which is positioned by electrostrictive structure 32. A flexible diaphragm is used to prevent non-axially positioned apertures from being illuminated.

The embodiments of FIGURES 6 and 7 have the inherent advantage that the emergent shaped light beams are always on the axis, and therefore approach the light-directing means (to be later discussed) at a fixed angle, and along a fixed path.

In FIGURE 8, a light beam 40 impinges on a fixedly positioned matrix 20 to produce a plurality of shaped light beams 42. Baffle 44 is positioned on actuator 32, which moves to permit selected shaped light beams to reach a light directing means.

FIGURE 9 shows another light beam shaping arrangement. Here a broad light beam 40 is directed toward a baffle that is mounted on the end of an electrostrictive structure. The single opening in the baffle produces a positionable pencil of light 48 that traverses sequentially selected apertures, and is accordingly shaped.

FIGURE 10 shows a different embodiment for obtaining a shaped or positioned light beam. Here, two electrostrictive element—or two pairs thereof—have slotted masks affixed thereto. As the elements bend backwards and forwards, the area which is overlapped by both slots moves its position. In this way the emergent light beam is repositioned and/or directed through selected apertures of a fixedly positioned matrix; and shaped light beams are thus produced. Alternatively, one of both slots can be angled with respect to their direction of movement.

In the embodiments shown in FIGURES 8, 9, and 10, the emergent light beams are parallel to, but not necessarily on the axis of the device—and therefore approach the light directing means at a fixed angle.

My electrostrictive actuator lends itself to another display usage, namely that of providing video-type signals. As shown in FIGURE 11, an electrostrictive structure 32 carries a baffle 50 having a very small opening. Structure 32 is energized in such a manner that the opening in baffle 50 moves in a series of parallel lines, this motion being readily produced by "sawtooth" deflection voltages of the type used in television. A beam of light shining through the moving opening thus "raster-scans" across a selected area of matrix 20. As the light beam scans the matrix, the light emerging from the transparent portions impinges on a photosensitive circuit whose output—when applied to a cathode ray tube—produces a display.

It may be desirable under some conditions where space is not at a premium, to have a plurality of separate character shaped apertures—each scanned by a separate electrostrictive structure.

If the scanned area is a matrix having character-shaped apertures, the display on the cathode ray tube would of course be a character or characters; but if a transparency were being scanned, the display would take a corresponding form.

The embodiments of FIGURES 9, 10, and 11 can also be used to produce lighted character displays by use of the "Lissajous" scanning method. This method is readily understood by visualizing a person holding a flashlight. An up-and-down wrist movement causes the spot of light to trace out a 1; a circular wrist movement produces an O; and a slightly more complex wrist movement produces an 8. Other characters can be similarly produced, and complete words may be spelled out. Furthermore, by extinguishing the flashlight at the proper times, spaces between words and/or letters can be produced. In the embodiments of FIGURES 9, 10, and 11, the "wrist movements" can be achieved by applying suitable energizing signals to the electrostrictive structure; and the light beam will then trace out the desired characters.

Figure 12:
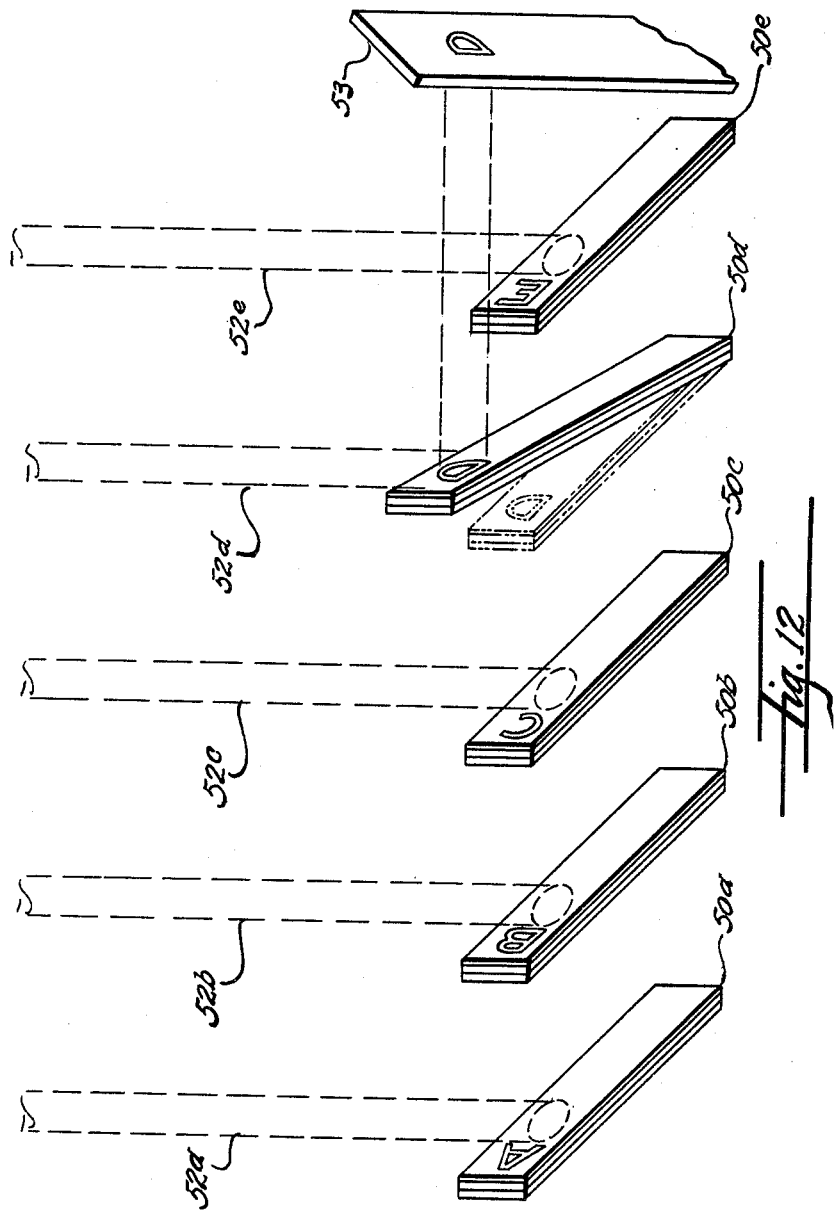

Another way of producing shaped light beams is shown in FIGURE 12. Here a plurality of electrostrictive elements 50a, 50b, 50c, etc., have reflective surfaces in the shape of characters. The elements are normally positioned at an angle such that light beams 52a, 52b, 52c, etc., ordinarily impinge on a non-reflective area. When a selected electrostrictive element—such as 50d—is energized, it moves from the dotted-line position to the solid-line position. The reflective pattern now intercepts its associated light beam, and reflects a shaped light beam over the heads of its neighbors to a light receptor 53. In this way light beams of selected cross section are sequentially produced and directed to provide a character-by-character display.

Figure 13:
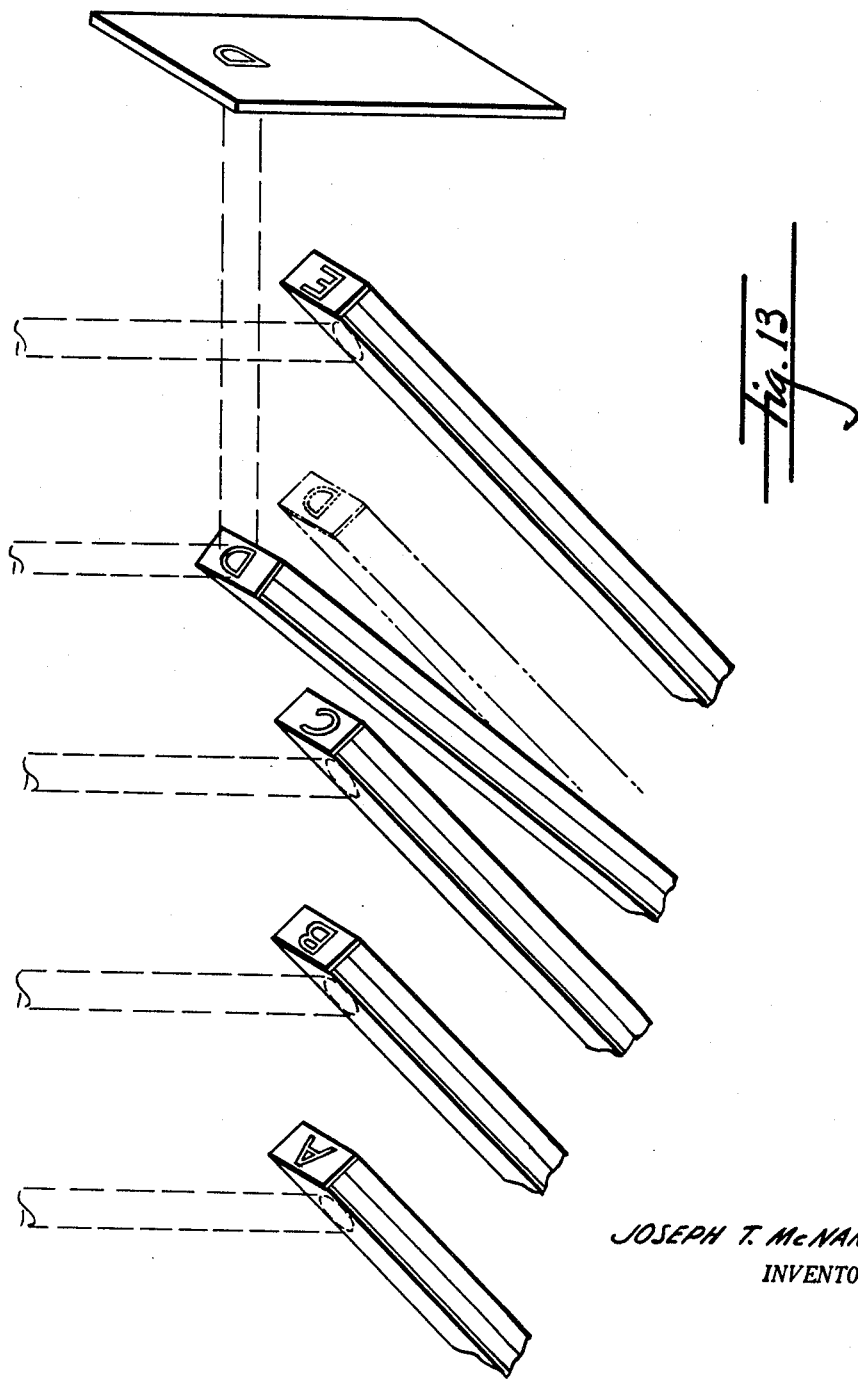

FIGURE 13 shows a modification wherein the electrostrictive elements have character-shaped reflective surfaces on their ends. As before, suitable energization of the actuators raises the reflective surface so that it intercepts a light beam. A selectively shaped light beam is thus produced, and directed over the heads of its neighbors to a light receptor.

Figure 14:
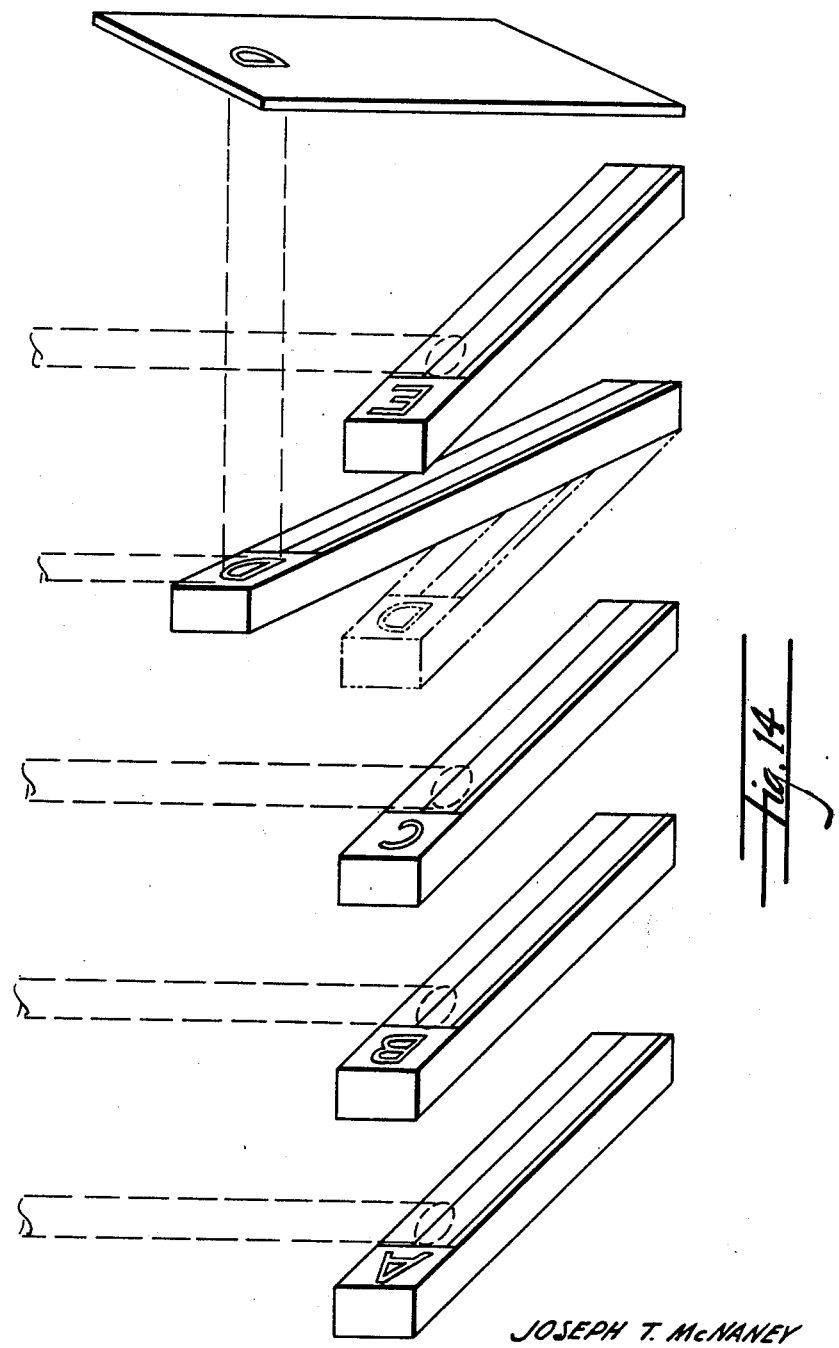

FIGURE 14 shows still another embodiment, wherein the energized electrostrictive element bends sidewards, so that its free end intercepts a light beam and directs it alongside its neighbors to a light receptor.

It will be noted that the embodiments of FIGURES 12, 13, and 14 have the inherent characteristics of both shaping and directing the emergent light beams to follow the same path to a light receptor. This has not been the case in such prior art light beam directing apparatus as have dealt with shaped light beams. Prior art devices have generally used one apparatus to produce the shaped light beams, and a second apparatus—usually pivoted or oscillating mirrors, or rotating prisms—to direct the light beams. These prior art light beam directing devices tend—generally speaking—to be limited to cyclic movements. Furthermore, they produce blurred displays; unless their movement is intermittent or the character is progressively displaced.

Figure 15:
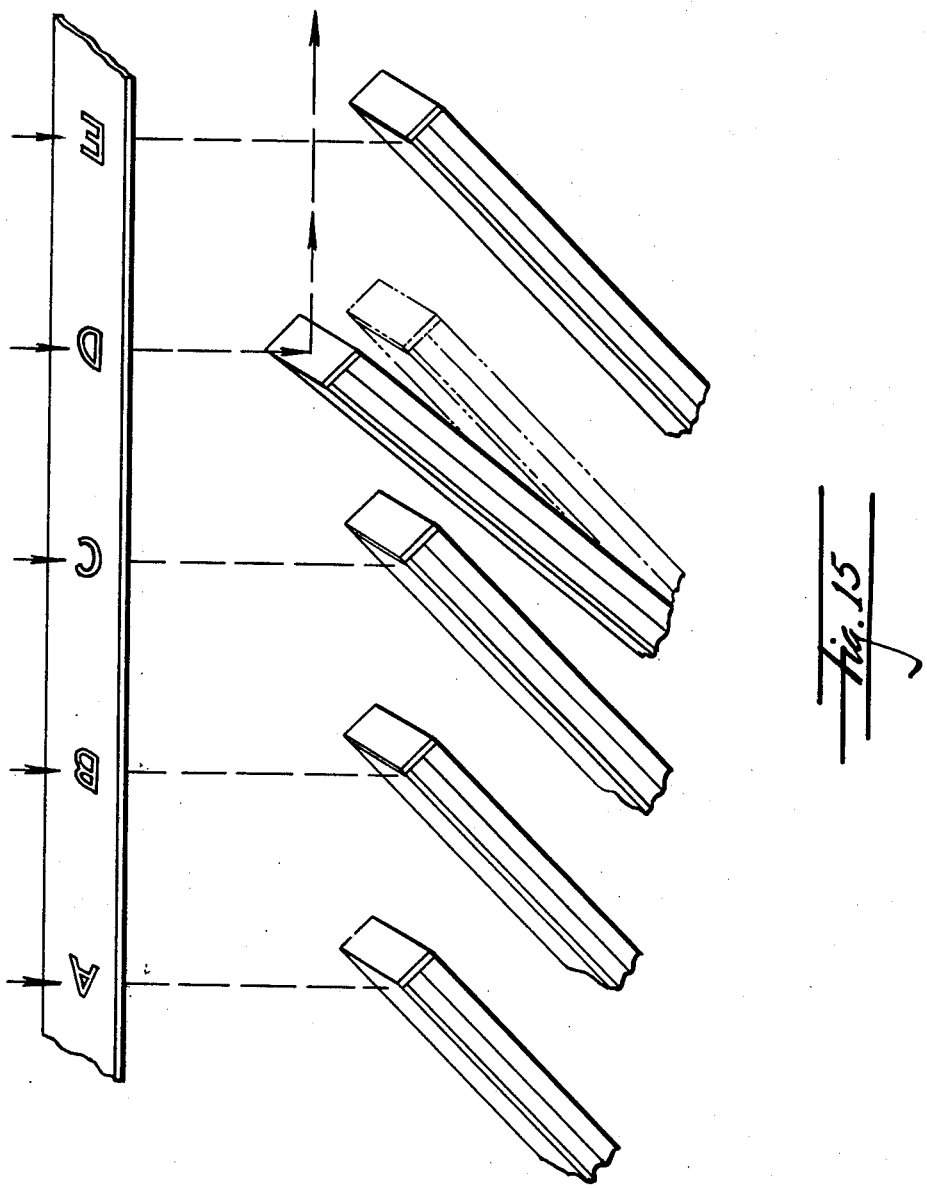

My inventive concept also includes the use of electrostrictive elements for directing previously shaped light beams to light receptors; without the limitation of intermittent or cyclic movement, or the blurring associated with prior art apparatus. FIGURE 15 shows electrostrictive elements used to direct a previously shaped light beam toward a light receptor. Any of the previously shown arrangements can be used to shape the light beams before they are directed to the electrostrictive element. As the actuators of FIGURE 15 are sequentially energized, bursts of shaped light beams are directed along the same given path to produce a character-by-character display.

The embodiments of my invention shown in FIGURES 12, 13, and 14 may be used for merely directing light beams, by the single expedient of forming the reflective areas into plane surfaces that reflect previously shaped light beams.

In FIGURE 16 a light beam 40 traverses a matrix 20 to provide a plurality of shaped light beams. A plurality of actuators is used, each of which, when energized, is capable of directing an individual shaped light beam to a light receptor. The embodiment of FIGURE 16 differs from those previously shown in that it permits combinations of characters to be simultaneously displayed. If desired, a single electrostrictive actuator may be used, and it may be sequentially positioned to direct selected shaped light beams toward a light receptor.

FIGURE 17 shows a decoder wherein coded input signals produce a character-by-character display. Here a plurality of shaped light beams are produced by matrix 20. A first actuator 60, moving under the control of coded signals in the directions shown by arrow 62, directs a column of shaped light beams toward a second actuator 64. This moves under the control of coded signals in the direction of arrow 66; and thus selects a given beam of the selected column. The selected beam may be directed through the opening of a mask 68. For example, the decoder illustrated in FIG. 17 is displaying the character "D" since actuator 60 has moved, under control of the coded signals applied thereto, to select the right-hand column of characters in matrix 20 by directing this column at actuator 64. Actuator 64 in turn moves, under control of the coded signals applied thereto, to select the uppermost character in the selected column, i.e. (D).

FIGURE 18 shows another embodiment of my invention wherein arrays of electrostrictive elements are used to produce and direct shaped light beams to a light receptor. A plurality of light beams 68 is directed toward a first array 70. Selected electrostrictive elements thereof shape and/or direct the light beams along axis 72. A second array 74, which again may be of any convenient type, directs the shaped light beam from axis 72 to a light receptor 76. If the elements of array 74 are sequentially activated, the bursts of light are sequentially positioned to spell out words, names, messages, etc.

FIGURE 19 shows another system for producing a display. A set 80 of electrostrictive elements is arranged to produce and/or direct character-shaped light beams corresponding to given characters—such as numbers, along a given path 81; and a light director 82 is positioned so that, when energized, it directs the selected beam to a light receptor.

A second set 84 of electrostrictive elements provides a second set of shaped light beams—such as letters; and a second light director 86 directs them to the light receptor. Other sets 88 and light directors 89 can supply other characters, such as symbols, punctuation marks, arrows, etc. All the light directors send the shaped light beams along the same path to a light receptor, thus providing a composite display.

It is at times desirable to produce a line-by-line display, and the system shown in FIGURE 20 accomplishes this result. Here multi-character matrix units 90–100 produce and/or direct selected shaped light beams that are reflected from fixed mirrors 102–112 to impinge on a light receptor. The mirrors permit the characters on the light receptor to be closer together than the size of the projectors may otherwise permit. Since the output of all units can be projected simultaneously, a complete line of information can be shown.

It is frequently desirable to energize selected actuators by means of light rays rather than electrical signals. This result is readily achieved by incorporating a photoconductive "switching" element into the energizing circuitry. As shown in FIGURE 21, the photoconductor 114 may be on the actuator itself, and may comprise a layer in contiguous relation with one of the electrodes. Thus, when light impinges on the photoconductor, its reduced resistance completes the circuit, and thereby energizes the actuator to move to the dotted-line position.

Alternatively, the photoconductive element may be positioned on the faceplate of a cathode ray tube, and be excited by a spot of light produced on the fluorescent screen by a suitably positioned electron beam.

The particular embodiment of the invention illustrated and described herein is illustrative only and the invention includes such other modifications and equivalents as may readily appear to those skilled in the art, within the scope of the appended claims.

I claim:

1. The combination comprising a first electrostrictive structure, means for moving one end of said first structure in a given direction; a first apertured mask affixed to said end of said first structure; a second electrostrictive structure; means for moving one end of said second structure direction perpendicular to said given direction; a second apertured mask affixed to said end of said second structure—whereby movement of said ends causes movement of said apertured masks such that the area common to both said structures moves.

2. The combination comprising: a first electrostrictive structure, means for moving one end of said first structure in a given direction, said direction establishing a first axis; a second electrostrictive structure; means for moving one end of said second structure direction perpendicular to said given direction, said direction establishing a second axis; and an apertured mask affixed to both said ends—whereby movement of said ends positions said mask.

3. The combination of claim 2 wherein said mask is on said axes.

4. The combination of claim 2 wherein said mask is offset from one said axis.

5. The combination of claim 2 wherein said mask is offset from both said axes.

6. The combination of claim 2 wherein said movement is a bending movement.

7. The combination of claim 2 wherein said movement is of the elongation-contraction type.

8. The combination comprising: a first pair of electromechanical actuators having ends capable of moving in a given direction; a second pair of actuators having ends capable of moving at right angles to said given direction; an intercepting element affixed to said ends and having a plurality of character-shaped apertures therein whereby movements of said pairs of actuators causes said element to move a selected amount in a predetermined direction, and means for directing a beam of energy to said element whereby the position of said element determines the positions of the character-shaped beams of energy transmitted thereby.

9. The combination comprising: an electrostrictive structure having an axis and a movable end; an apertured mask positioned on said end; means for causing said end to move in a given direction; and means for causing said end to move substantially perpendicular to said given direction—whereby said mask may be selectively positioned.

10. The combination of claim 9 wherein said structure is of the strip type.

11. The combination of claim 9 wherein said structure is of the tubular type.

12. The combination comprising: an electrostrictive structure having an axis and a movable end; an apertured matrix positioned on said end; means for causing said end to move in a given direction; and means for causing said end to move substantially perpendicular to said given direction—whereby said matrix may be selectively positioned; means for directing a beam of energy along said axis of said structure; and means causing said structure to position a selected portion of said matrix on said axis.

13. The combination of claim 12 wherein said beam of energy is an electron beam, and said matrix is electron opaque, but has electron permeable areas.

14. The combination of claim 12 wherein said beam of energy is a light beam, and said matrix is opaque with transparent areas.

15. In a cathode ray tube having an evacuated envelope with means for producing an axial electron beam, the combination comprising: an electrostrictive structure positioned in said tube; a matrix affixed to the end of said structure, said matrix having electron permeable apertures therein; and means for causing said structure to position one of said apertures on the axis of said tube.

16. A cathode ray tube comprising: an evacuated envelope having a target, means for producing and directing an electron beam along the axis of said tube; an electrostrictive structure positioned on said axis; a matrix affixed to said structure, said matrix being electron opaque and having electron permeable apertures in the shape of characters; means for causing said structure to sequentially position selected apertures on said axis of said tube so that said axial electron beam sequentially traverses said axially positioned apertures and the emergent beams are thereby shaped; and means for projecting said shaped emergent beams onto said target.

17. Apparatus for producing shaped light beams comprising: an electrostrictive actuator; a matrix affixed to said actuator, said matrix having transparent areas; a mask having an aperture; means for causing said actuator to position a selected transparent area in alignment with said aperture.

18. A shaped beam producing structure comprising: an axis; an electrostrictive actuator positioned along said axis; a matrix affixed to said actuator, said matrix having shaped apertures; a mask having an aperture positioned on said axis; a source of energy; means for directing energy from said source along said axis; means for causing said actuator to position a selected shaped aperture on said axis—whereby energy traverses said axially positioned masking aperture and said axially positioned shaped aperture to produce a shaped beam.

19. The combiation of claim 18 wherein said matrix is between said source and said mask.

20. The combination of claim 18 wherein said mask is between said source and said matrix.

21. A shaped beam producing structure comprising: an axis; an electrostrictive actuator positioned along said axis; a mask having an aperture affixed to said actuator; a matrix having character-shaped shaping apertures; means, comprising a source of energy, for directing energy along said axis; means for causing said actuator to position said aperture of said mask in alignment with selected shaping apertures—whereby energy from said source traverses said aligned shaping aperture and said masking aperture.

22. The combination of claim 21 wherein said matrix is between said source and said mask.

23. The combination of claim 21 wherein said mask is between said source and said matrix.

24. In combination, an electrostrictive element, means for applying an electrical signal to said electrostrictive element to cause a portion of said element to assume various positions depending upon said electrical signal, a mask having a plurality of character-shaped apertures mechanically coupled to said portion of said electrostrictive element, and means for directing a beam of energy at said mask to selectively shape said beam depending upon said electrical signal.

25. In combination, an electrostrictive element, means for applying an electrical signal to said electrostrictive element to cause a portion of said element to assume various positions depending upon said electrical signal, an opaque mask having a plurality of transparent configurations thereon, said mask being mechanically coupled to said electrostrictive element, and means for directing a beam of light at said mask to selectively shape said beam to form a particular character.

26. A cathode-ray tube comprising an evacuated envelope having a target therein, means for producing an electron beam and directing said beam along a line within said tube, an electrostrictive structure positioned within said tube, a matrix affixed to said structure, said matrix being electron opaque and having electron permeable apertures in the shape of characters, means for causing said structure to position selected apertures on said line within said tube so that said electron beam traverses selected apertures and the emergent beams are thereby shaped, and means for projecting said shaped emergent beams onto said target.

27. In combination, a plurality of strip-type electromechanical elements each having a reflective surface having the configurtion of a particular character on a portion thereof, and means for causing a particular element to move so that selected reflective surfaces intercept selected beams of light to form a shaped reflected beam.

28. The combination as set forth in claim 27 wherein said reflected beams pass alongside the unmoved elements and therefore are not blocked by said elements.

29. In combination, a target, means for generating a plurality of beams of energy shaped to represent characters, means for directing said beams at a plurality of selectively movable elements each of which is associated with a corresponding one of said plurality of shaped beams and each of which has a reflective surface mounted thereon, means for selectively moving various ones of said movable elements to cause said elements to reflect corresponding shaped beams and project them upon said target.

30. In combination, a target, means for generating a plurality of beams of energy each of which is shaped to represent a particular character, said plurality of beams being positioned in space in a plurality of columns, a first and second electrostrictive element each having a reflective surface affixed thereto, means for selectively positioning said first electrostrictive element to cause a particular column of said shaped beams to be reflected by the reflective surface of said first electrostrictive element and to be forward to said second electrostrictive element, means for causing the reflective surface affixed to said second electrostrictive element to selectively intercept one of the shaped beams in said selected column reflected from said first electrostrictive element, and means for forwarding said selected beam to said target.

31. In combination, a target, means for generating a plurality of beams of energy, said plurality of beams being positioned in space in a plurality of columns, a first and second electrostrictive element each having a reflective surface affixed thereto, means for selectively positioning said first electrostrictive element to cause a particular column of said shaped beams to be forwarded to said second electrostrictive element, means for causing the reflective surface affixed to said second electrostrictive element to to selectively intercept one of the beams in said selected column reflected from said first electrostrictive element, and means for forwarding said selected beam to said target.

32. In combination, an electrostrictive element, means for applying an electrical signal to said electrostrictive element to cause a portion of said element to assume various positions depending upon said electrical signal, a mask having a shaped aperture mechanically coupled to said portion of said electrostrictive element, and means for directing a beam of energy at said mask to shape said beam in the shape of said aperture.

33. In combination, an electrostrictive element, means for applying an electrical signal to said electrostrictive element to cause a portion of said element to assume various positions depending upon said electrical signal, a mask having a plurality of transparent configurations thereon, said mask being mechanically coupled to said electrostrictive element, and means for directing a beam of light at said mask to shape said beam.

34. In combination, a plurality of strip-type electromechanical elements each having a reflective surface and means for causing a particular element to move so that a selected reflective surface intercepts a selected beam of light to form a reflected beam which passes alongside the unmoved elements and therefore is not blocked by said elements.

References Cited in the file of this patent

UNITED STATES PATENTS

| | | |
|---|---|---|
| 1,438,974 | Wente | Dec. 19, 1922 |
| 1,760,198 | Hough | Apr. 27, 1930 |
| 1,787,647 | Sollie | Jan. 6, 1931 |
| 2,034,583 | Koch | Mar. 17, 1936 |
| 2,289,205 | Nagy et al. | July 7, 1942 |
| 2,373,445 | Baerwald | Apr. 10, 1945 |
| 2,465,898 | Martin | Mar. 29, 1949 |
| 2,540,851 | Wiggins et al. | Feb. 6, 1951 |
| 2,836,652 | Sprague | May 27, 1958 |
| 2,838,695 | Thurston | June 10, 1958 |
| 2,838,696 | Thurston | June 10, 1958 |
| 2,900,536 | Palo | Aug. 18, 1959 |
| 2,939,982 | McNaney | June 7, 1960 |
| 2,943,220 | McNaney | June 28, 1960 |

FOREIGN PATENTS

| | | |
|---|---|---|
| 514,207 | Belgium | Sept. 20, 1952 |